United States Patent
Peng et al.

(10) Patent No.: US 9,782,953 B2
(45) Date of Patent: Oct. 10, 2017

(54) APPARATUS AND A METHOD FOR BONDING AND INSULATING ND—FE—B PERMANENT MAGNETS

(71) Applicant: Yantai Shougang Magnetic Materials Inc., Yantai (CN)

(72) Inventors: Zhongjie Peng, Yantai (CN); Daoning Jia, Yantai (CN); Kunkun Yang, Yantai (CN)

(73) Assignee: YANTAI SHOUGANG MAGNETIC MATERIALS INC., Yantai (CN)

( * ) Notice: Subject to any disclaimer, the term of this patent is extended or adjusted under 35 U.S.C. 154(b) by 30 days.

(21) Appl. No.: 14/953,843

(22) Filed: Nov. 30, 2015

(65) Prior Publication Data

US 2016/0152003 A1   Jun. 2, 2016

(30) Foreign Application Priority Data

Nov. 28, 2014  (CN) .......................... 2014 1 0698074

(51) Int. Cl.
*B32B 7/12* (2006.01)
*H01F 41/02* (2006.01)
(Continued)

(52) U.S. Cl.
CPC .............. *B32B 7/12* (2013.01); *B32B 15/043* (2013.01); *B32B 15/18* (2013.01);
(Continued)

(58) Field of Classification Search
CPC ......... B32B 37/16; B32B 37/12; B32B 37/10; B32B 37/06; B32B 37/0053; B32B 15/18;
(Continued)

(56) References Cited

U.S. PATENT DOCUMENTS 8,142,573 B2   3/2012  Kobayashi et al.
2004/0046469 A1*  3/2004  Oshima .................. H02K 1/276
                                                      310/156.21
(Continued)

FOREIGN PATENT DOCUMENTS

CN    101763929 A    6/2010
CN    101913132 A   12/2010
(Continued)

OTHER PUBLICATIONS

Machine translated CN 101 763 929 A.*

*Primary Examiner* — Vishal I Patel
(74) *Attorney, Agent, or Firm* — William H. Honaker; Dickinson Wright PLLC

(57) ABSTRACT

A method for bonding a plurality of Nd—Fe—B permanent magnets includes a step of curing the layer of insulating adhesive at an initial temperature of between 20° C. and 250° C. and between 0.1 hr and 24 hr prior to the step of sandwiching. A predetermined clamping pressure of between 0.1 MPa and 10 MPa is then applied to the Nd—Fe—B permanent magnets. The stacked Nd—Fe—B permanent magnet is cured at a predetermined temperature of between 150° C. and 350° C. and between 0.1 hr and 12 hr. A clamping tool apparatus includes at least one of three intermediate guides disposed on the lower plate, in the chamber, spaced from the magnet positioning members, and extends to a proximal end defining a second predetermined distance with the second predetermined distance being less than the first predetermined distance of the magnet positioning members. The upper plate defines a plurality of apertures for receiving the magnet positioning members and the intermediate guides.

8 Claims, 1 Drawing Sheet

(51) Int. Cl.
*B32B 15/04* (2006.01)
*B32B 15/18* (2006.01)
*B32B 37/00* (2006.01)
*B32B 37/06* (2006.01)
*B32B 37/10* (2006.01)
*B32B 37/12* (2006.01)
*B32B 37/16* (2006.01)
*B32B 38/00* (2006.01)
*B32B 38/10* (2006.01)
*B32B 38/16* (2006.01)
*H01F 7/02* (2006.01)
*H01F 1/057* (2006.01)

(52) U.S. Cl.
CPC .......... *B32B 37/0053* (2013.01); *B32B 37/06* (2013.01); *B32B 37/10* (2013.01); *B32B 37/12* (2013.01); *B32B 37/1284* (2013.01); *B32B 37/16* (2013.01); *B32B 38/0036* (2013.01); *B32B 38/10* (2013.01); *B32B 38/162* (2013.01); *H01F 7/021* (2013.01); *H01F 41/0253* (2013.01); B32B 2038/0076 (2013.01); B32B 2255/06 (2013.01); B32B 2255/26 (2013.01); B32B 2305/72 (2013.01); B32B 2307/208 (2013.01); B32B 2307/304 (2013.01); B32B 2309/025 (2013.01); B32B 2309/12 (2013.01); B32B 2311/00 (2013.01); B32B 2311/30 (2013.01); B32B 2313/02 (2013.01); *H01F 1/0577* (2013.01)

(58) Field of Classification Search
CPC ..... B32B 15/043; B32B 2311/30; B32B 7/12; B32B 2313/02; B32B 2311/00; B32B 2309/12; B32B 2309/025; B32B 2307/304; B32B 2307/208; B32B 2305/72; B32B 2255/26; B32B 2255/06; B32B 2038/0076; B32B 38/162; B32B 38/10; B32B 38/0036; B32B 37/1284; H01F 41/0253; H01F 1/0577
See application file for complete search history.

(56) References Cited

U.S. PATENT DOCUMENTS

| | | | |
|---|---|---|---|
| 2006/0234085 A1* | 10/2006 | Nakano | H01F 41/026 428/692.1 |
| 2010/0164663 A1* | 7/2010 | Nagata | C22C 38/005 335/302 |
| 2015/0171717 A1* | 6/2015 | Wakade | B22F 3/1007 29/598 |

FOREIGN PATENT DOCUMENTS

| | | |
|---|---|---|
| CN | 201745223 U | 2/2011 |
| CN | 103021610 A | 4/2013 |
| CN | 203918833 U | 5/2014 |
| CN | 204300062 U | 4/2015 |
| DE | 2263656 A1 | 7/1974 |
| DE | 4323656 A1 | 1/1995 |

* cited by examiner

APPARATUS AND A METHOD FOR BONDING AND INSULATING ND—FE—B PERMANENT MAGNETS

CROSS REFERENCE TO RELATED APPLICATION

This application claims the benefit of a Chinese application having a serial number of 201410698074.7, published as CN 104454852 A, and filed on Nov. 28, 2014.

BACKGROUND OF THE INVENTION

1. Field of the Invention

The present invention generally relates to a clamping tool apparatus for stacking a plurality of Nd—Fe—B permanent magnets and a method for bonding a plurality of Nd—Fe—B permanent magnets.

2. Description of the Prior Art

Recently, with the increasing use of Nd—Fe—B permanent magnets in motors, rotor eddy-current loss has become a key factor that affects the reliability of high speed permanent magnet motors' operation. Because the rotors have poor heat dissipation, eddy-currents generated by the permanent magnets spun at a high speed will increase the rotor's temperature thereby causes the permanent magnets to demagnetize. Therefore, a plurality of Nd—Fe—B permanent magnets are bonded together to reduce the rotor eddy-current loss.

Traditional methods of bonding the Nd—Fe—B permanent magnets include using glass beads mixed together with adhesives. Then, the glass beads and the adhesives are applied to the surface of the Nd—Fe—B permanent magnets. A clamping tool apparatus is used to sandwich the Nd—Fe—B permanent magnets together. Then, the Nd—Fe—B permanent magnets are cured. However, there are many drawbacks associated with the traditional method. Specifically, mixing the glass beads reduces the strength of the adhesive. In addition, the glass beads are not all uniform in size; therefore, it is difficult to have a layer of adhesives between the permanent magnet that has uniform thickness. Furthermore, the use of glass beads creates a large gap between the Nd—Fe—B permanent magnets. When sandwiching the Nd—Fe—B permanent magnets, some of the glass beads may move or be crushed, this makes it difficult to maintain the insulation characteristics between the Nd—Fe—B permanent magnets. Therefore, the success rate of using the traditional method to bond the Nd—Fe—B permanent magnets is very low and, often, additional tests are required to ensure proper insulation exists between the Nd—Fe—B permanent magnets.

Such a clamping tool apparatus is disclosed in Chinese Patent 101763929 B. The clamping tool apparatus includes a frame having a U-shape in cross-section. The frame includes a lower plate and a pair of magnet positioning members. The magnet positioning members are disposed on the lower plate spaced from one another and extending perpendicularly outwardly from the lower plate to define the U-shape and a chamber between the lower plate and the magnet positioning members. An upper plate extends between the magnet positioning members and slidably attached to the magnet positioning members. A fastener is slidably dispose on each of the magnet positioning members to secure the upper plate between the fastener and the lower plate.

Such a method is also disclosed in the Chinese Patent 101763929 B. The method includes a method for bonding a plurality of Nd—Fe—B permanent magnets having a first Nd—Fe—B permanent magnet and a second Nd—Fe—B permanent magnet. The plurality of Nd—Fe—B permanent magnets also includes rust and grease disposed on the surface of the Nd—Fe—B permanent magnets. The method uses an insulating adhesive and the clamping tool apparatus. The clamping tool apparatus includes the lower plate having the pair of magnet positioning members extending outwardly from the lower plate. The upper plate is slidably disposed on magnet positioning members. The fastener is disposed on each of the magnet positioning members.

The method includes a first step of cleaning the plurality of the Nd—Fe—B permanent magnets including the grease and the rust to remove the grease and the rust. The next step of the method is depositing a layer of insulating adhesive on the surface of each of the Nd—Fe—B permanent magnets. Then, the layer of insulating adhesive on the surface of second Nd—Fe—B permanent magnet and the layer of insulating adhesive on the surface of the first Nd—Fe—B permanent magnet are sandwiched between the first Nd—Fe—B permanent magnet and the second Nd—Fe—B permanent magnet by stacking the second Nd—Fe—B permanent magnet on the first Nd—Fe—B permanent magnet to combine the layer of insulating adhesive on the surface of second Nd—Fe—B permanent magnet and the layer of insulating adhesive on the surface of the first Nd—Fe—B permanent magnet to form a combined adhesive layer of insulating adhesive between the first Nd—Fe—B permanent magnet and the second Nd—Fe—B permanent magnet. Next, a predetermined clamping pressure is applied to the first Nd—Fe—B permanent magnet and the second Nd—Fe—B permanent magnet to produce a stacked Nd—Fe—B permanent magnet. The next step of the method is curing the stacked Nd—Fe—B permanent magnet. After curing the stacked Nd—Fe—B permanent magnet, the stacked Nd—Fe—B permanent magnet is cooled to room temperature. Then, the stacked Nd—Fe—B permanent magnet is machined. After machining the stacked Nd—Fe—B permanent magnet, a protective layer is deposited on the stacked Nd—Fe—B permanent magnet.

SUMMARY OF THE INVENTION

The invention provides for such a clamping cool apparatus including at least one intermediate guide disposed on the lower plate and in the chamber, spaced from the magnet positioning members, and extending perpendicularly outwardly from the lower plate for receiving the plurality of Nd—Fe—B permanent magnets.

The invention provides for such a method including a step of curing the layer of insulating adhesive on the surface of the Nd—Fe—B permanent magnets prior to the step of sandwiching the layer of insulating adhesive on the surface of second Nd—Fe—B permanent magnet and the layer of insulating adhesive on the surface of the first Nd—Fe—B permanent magnet.

Advantages of the Invention

The present invention overcomes the shortages of the existing technologies, and provides a method of bonding the plurality of the Nd—Fe—B permanent magnets.

The present invention provides a layer of insulating adhesives between the permanent magnet that has a uniform thickness. In addition, the present invention maintains the insulation characteristics between the Nd—Fe—B permanent magnets.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
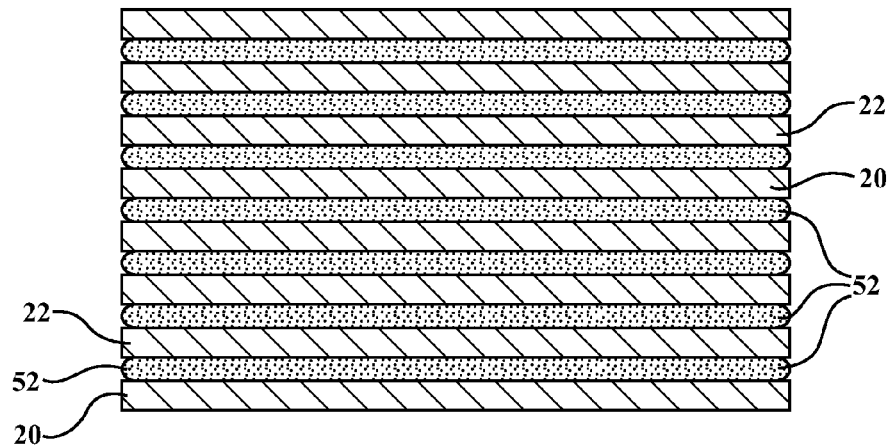
FIG. 1 is a cross-sectional view of the stacked Nd—Fe—B permanent magnet.
Figure 2:
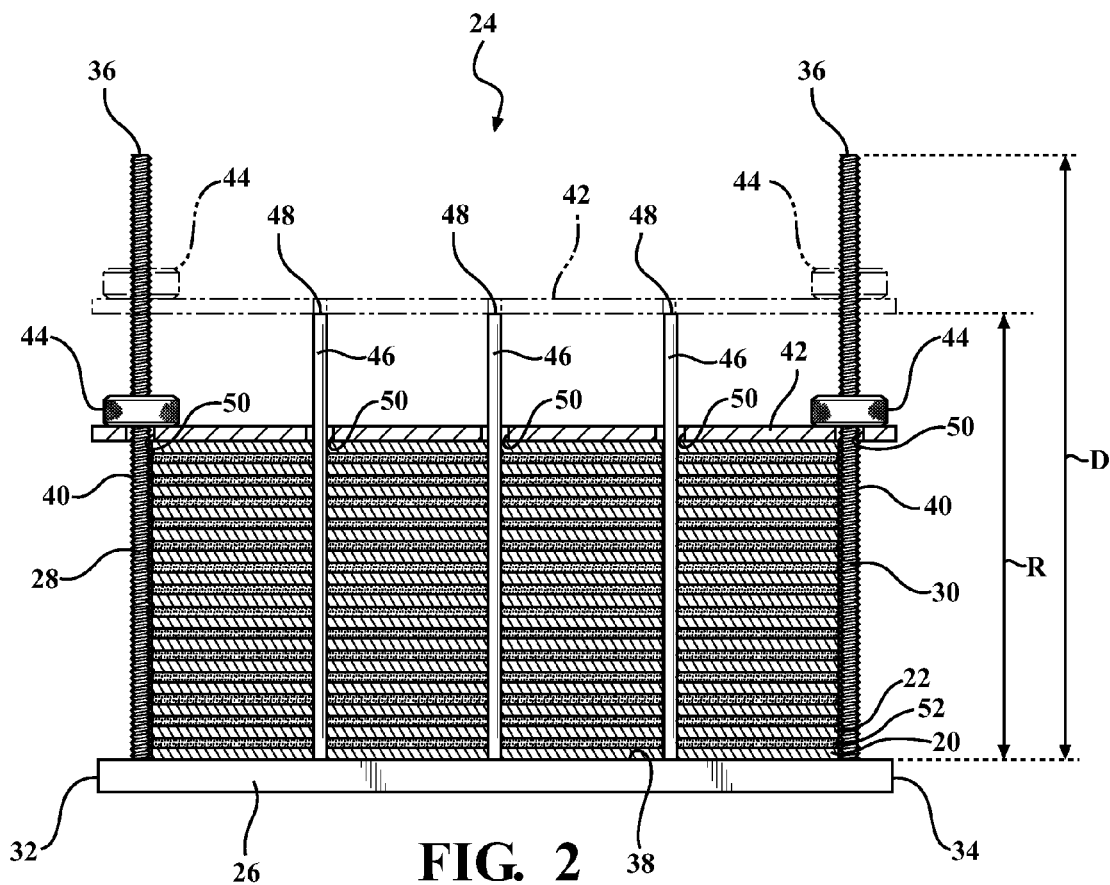
FIG. 2 is a cross-sectional view of the clamping tool apparatus having a stacked Nd—Fe—B permanent magnet sandwiched between the upper plate and the lower plate of the clamping tool apparatus.

Referring to the Figures, wherein like numerals indicate corresponding parts throughout the several views, a stack of Nd—Fe—B permanent magnets 20, 22 are shown in FIG. 1 and a clamping tool apparatus 24 for stacking the plurality of Nd—Fe—B permanent magnets 20, 22 is generally shown in FIG. 2.

The clamping tool apparatus 24 includes a frame 26, 28, 30 having a U-shape in cross-section. The frame 26, 28, 30 includes a lower plate 26 having a rectangular shape in cross-section. The lower plate 26 extends between a pair of ends 32, 34 including a first end 32 and a second end 34. The frame 26, 28, 30 further includes a pair of magnet positioning members 28, 30 disposed on the lower plate 26. The magnet positioning members 28, 30 includes a first positioning member 28 and a second positioning member 30. The first positioning member 28 is disposed adjacent to the first end 32 of the lower plate 26. The second positioning member 30 is disposed adjacent to the second end 34 of the lower plate 26 spaced from the first positioning member 28. The magnet positioning members 28, 30 extend perpendicularly outwardly from the lower plate 26 to a distal end 36 spaced a first predetermined distance D apart from the lower plate 26 to define the U-shape of the frame 26, 28, 30 to prevent the plurality of Nd—Fe—B permanent magnets 20, 22 from sliding relative to one another in response to a pressure applied to the plurality of Nd—Fe—B permanent magnets 20, 22. The lower plate 26 and the magnet positioning members 28, 30 also defines a chamber 38 between the lower plate 26 and the magnet positioning members 28, 30 for receiving the plurality of Nd—Fe—B permanent magnets 20, 22. Each of the magnet positioning members 28, 30 defines a thread 40 extending from the lower plate 26 to the distal end 36 and helically about each of the magnet positioning members 28, 30.

An upper plate 42 having a rectangular shape in cross-section extends between the magnet positioning members 28, 30 and slidably attached to the magnet positioning members 28, 30. A fastener 44 is disposed on each of the magnet positioning members 28, 30 and engaging the magnet positioning members 28, 30 to secure the upper plate 42 between the fastener 44 and the lower plate 26 for compressing the plurality of Nd—Fe—B magnets 20, 22 between the upper plate 42 and the lower plate 26. The fastener 44 can be a nut disposed on each of the magnet positioning members 28, 30 and engaging the thread 40 of the magnet positioning members 28, 30. It should be appreciated that, instead of the nut, the fastener 44 can be a sliding tube including a friction element for engaging the magnet positioning members 28, 30.

The clamping tool apparatus 24 further includes at least one intermediate guide 46 disposed on the lower plate 26, in the chamber 38, and spaced from the magnet positioning members 28, 30. The intermediate guide 46 extends perpendicularly outwardly from the lower plate 26 to a proximal end 48 spaced a second predetermined distance R apart from the lower plate 26 with the second predetermined distance R being less than the first predetermined distance D for receiving the plurality of Nd—Fe—B permanent magnets 20, 22 and allowing the plurality of Nd—Fe—B permanent magnets 20, 22 to receive even pressure when compressed between the upper plate 42 and the lower plate 26. The at least one intermediate guide 46 may further includes three intermediate guides 46 disposed on the lower plate 26, in the chamber 38, and spaced from the magnet positioning members 28, 30. Each one of the intermediate guide 46 extends perpendicularly outwardly from the lower plate 26 to the proximal end 48. The upper plate 42 defines a plurality of apertures 50 having a circular shape disposed on the upper plate 42 spaced apart from one another for receiving the magnet positioning members 28, 30 and the intermediate guides 46 to allow the upper plate 42 to slide along the magnet positioning members 28, 30 and the intermediate guides 46.

It is another aspect of the present invention to include a method for bonding a plurality of Nd—Fe—B permanent magnets 20, 22 having a first Nd—Fe—B permanent magnet 20 and a second Nd—Fe—B permanent magnet 22. The plurality of Nd—Fe—B permanent magnets 20, 22 also includes rust and grease disposed on the surface of the Nd—Fe—B permanent magnets 20, 22. The method uses an insulating adhesive and the clamping tool apparatus 24. The clamping tool apparatus 24 includes the lower plate 26 having the pair of magnet positioning members 28, 30 extending outwardly from the lower plate 26. The upper plate 42 is slidably disposed on magnet positioning members 28, 30. The fastener 44 is disposed on each of the magnet positioning members 28, 30.

The first step of the method is cleaning the plurality of the Nd—Fe—B permanent magnets 20, 22 including the grease and the rust to remove the grease and the rust. The step of cleaning the plurality of the Nd—Fe—B permanent magnets 20, 22 further includes a step of phosphating the plurality of Nd—Fe—B permanent magnets 20, 22. After phosphatizing the plurality of Nd—Fe—B permanent magnets 20, 22, the plurality of Nd—Fe—B permanent magnets 20, 22 are washed using a solution selected from at least one of alcohol and naphtha and acetone and isopropanol to remove the grease and the rust from the surface of the Nd—Fe—B permanent magnets 20, 22. The step of cleaning the plurality of Nd—Fe—B permanent magnets 20, 22 further includes a step of activating the surface of the Nd—Fe—B permanent magnets 20, 22 by subjecting the surface of the Nd—Fe—B permanent magnets 20, 22 to a plasma cleaning process following the under Air, Argon, or Nitrogen for a duration of no more than 10 min.

Prior to the step of cleaning, the method may include a step of sintering the plurality of Nd—Fe—B permanent magnets 20, 22 to densify the plurality of Nd—Fe—B permanent magnets 20, 22. Alternatively, instead of sintering, the method may include a step of diffusing a rare earth metal powder containing at least one of Terbium and Dysprosium into the plurality of Nd—Fe—B permanent magnets 20, 22.

The next step of the method is depositing a layer of insulating adhesive having a thickness of between 1 μm and 100 μm on the surface of each of the Nd—Fe—B permanent magnets 20, 22. The step of depositing the layer of insulating adhesive is further defined as depositing a thermosetting resin selected from one of epoxy resin and phenol resin on the surface of the first Nd—Fe—B permanent magnet 20 and the surface of the second Nd—Fe—B permanent magnet 22. In addition, the step of depositing the layer of insulating adhesive can be further defined as spraying, using a brush to paint, and/or using a roller to paint the layer of insulating adhesive on the surface of the first Nd—Fe—B permanent magnet 20 and the surface of the second Nd—Fe—B permanent magnet 22. Typically, the layer of insulating adhesive is first deposited on the surface of the first Nd—Fe—B permanent magnets 20 at a thickness of between 1-15 μm. If necessary, the layer of insulating adhesive can be deposited on the surface of the Nd—Fe—B permanent magnets 20, 22 having a thickness of no more than 100 μm.

The next step of the method is sandwiching the layer of insulating adhesive on the surface of second Nd—Fe—B permanent magnet 22 and the layer of insulating adhesive on the surface of the first Nd—Fe—B permanent magnet 20 between the first Nd—Fe—B permanent magnet 20 and the second Nd—Fe—B permanent magnet 22 by stacking the second Nd—Fe—B permanent magnet 22 on the first Nd—Fe—B permanent magnet 20. The stacking of the second Nd—Fe—B permanent magnet 22 on the first Nd—Fe—B permanent magnet 20 combines the layer of insulating adhesive on the first Nd—Fe—B permanent magnet 20 and the second Nd—Fe—B permanent magnet 22 to form a combined adhesive layer 52. The combined adhesive layer 52 of insulating adhesive has a total thickness between 2 μm and 200 μm between the first Nd—Fe—B permanent magnet 22 and the second Nd—Fe—B permanent magnet 24. In other words, the layer of insulating adhesive on both the surface of the first Nd—Fe—B permanent magnet 20 and the second Nd—Fe—B permanent magnet 22 are sandwiched between the first Nd—Fe—B permanent magnet 20 and the second Nd—Fe—B permanent magnet 22 to form the combined adhesive layer 52.

The next step of the method is applying a predetermined clamping pressure to the first Nd—Fe—B permanent magnet 20 and the second Nd—Fe—B permanent magnet 22 to produce a stacked Nd—Fe—B permanent magnet 20, 22 as generally shown in FIG. 1. The step of applying the predetermined clamping pressure is further defined as applying the predetermined clamping pressure of between 0.1 MPa and 10 MPa to the first Nd—Fe—B permanent magnet 20 and the second Nd—Fe—B permanent magnet 22. The step of applying the predetermined clamping pressure further includes a step of sandwiching the first Nd—Fe—B permanent magnet 20 and the second Nd—Fe—B permanent magnet 22 between the upper plate 42 of the clamping tool apparatus 24 and the lower plate 26 of the clamping tool apparatus 24. The step of applying the predetermined clamping pressure may be further defined as tightening the fasteners 44 against the upper plate 42 of the clamping tool apparatus 24 and the lower plate 26 of the clamping tool apparatus 24 to apply the predetermined clamping pressure of between 0.1 MPa and 10 MPa.

After producing the stacked Nd—Fe—B permanent magnet 20, 22, the next step of the method is curing the stacked Nd—Fe—B permanent magnet 20, 22. Then, the stacked Nd—Fe—B permanent magnet 20, 22 is cooled to room temperature. After cooling the stacked Nd—Fe—B permanent magnet 20, 22, the stacked Nd—Fe—B permanent magnet 20, 22, is machined. The step of machining the stacked Nd—Fe—B permanent magnet 20, 22 is further defined as using a wire cutting tool, a disc cutting tool, and/or a multi-wire cutting tool to machine the stacked Nd—Fe—B permanent magnet 20, 22. Then, a protective layer selected from one of epoxy resin and phenol resin and having a thickness of between 8 μm and 50 μm is deposited on the stacked Nd—Fe—B permanent magnet 20, 22.

Prior to the step of sandwiching the layer of insulating adhesive on the surface of second Nd—Fe—B permanent magnet 22 and the layer of insulating adhesive on the surface of the first Nd—Fe—B permanent magnet 20, the method further includes a step of curing the layer of insulating adhesive on the surface the Nd—Fe—B permanent magnets 20, 22. The step of curing the layer of insulating adhesive on the surface of the Nd—Fe—B permanent magnets 20, 22 can be further defined as heating the Nd—Fe—B permanent magnets 20, 22 including the layer of insulating adhesive at an initial temperature of between 20° C. and 250° C. for an initial duration of between 0.1 hr and 24 hr. The curing step prior to the step of sandwiching the layer of insulating adhesive prevents the layer of insulating adhesive from leaking from the stacked Nd—Fe—B permanent magnets 20, 22. It is possible for the layer of insulating adhesive to leak from the stacked Nd—Fe—B permanent magnet 20, 22 because the layer of insulating adhesive is still in a liquid phase or an uneven application of the predetermined clamping pressure between the first Nd—Fe—B permanent magnet 20 and the second Nd—Fe—B permanent magnet 22 thereby affect the insulating properties of the layer of insulating material. It should be appreciated that once the layer of adhesive is cured on the surface of the Nd—Fe—B permanent magnet, another layer of insulating adhesive can be deposited on the opposite surface of the Nd—Fe—B permanent magnet. Accordingly, the layer of insulating adhesive on the opposite surface of the Nd—Fe—B permanent magnet can also be cured.

The step of curing the stacked Nd—Fe—B permanent magnet 20, 22 is further defined as curing the stacked Nd—Fe—B permanent magnet 20, 22 at a predetermined temperature of between 150° C. and 350° C. for a second duration of between 0.1 hr and 12 hr. Under the predetermined temperature, the combined adhesive layer 52 of insulated adhesive softens and attaches to the first Nd—Fe—B permanent magnet 20 and the second Nd—Fe—B permanent magnet 22 thereby ensures the insulation between the first Nd—Fe—B permanent magnet 20 and the second Nd—Fe—B permanent magnet 22.

The step of applying the predetermined clamping pressure to the first Nd—Fe—B permanent magnet 20 and the second Nd—Fe—B permanent magnet 22 is further defined as applying the predetermined clamping pressure of between 0.1 MPa and 10 MPa to the first Nd—Fe—B permanent magnet 20 and the second Nd—Fe—B permanent magnet 22. It should be noted that, if the predetermined clamping pressure applied is less than 0.1 MPa, the first Nd—Fe—B permanent magnet 20 and the second Nd—Fe—B permanent magnet 22 will not be adhered to one another. If the predetermined clamping pressure applied is greater than 10 MPa, it will cause the combined adhesive layer 52 of insulating adhesive between the first Nd—Fe—B permanent magnet 20 and the second Nd—Fe—B permanent magnet 22 to deform. In addition, it should be appreciated that the present method for bonding the plurality of Nd—Fe—B permanent magnets 20, 22 can be used to bond between two and up to twenty-five pieces of the Nd—Fe—B permanent magnets 20, 22 together.

In order to have a better understanding of the present invention, the implementing examples set forth below provide illustrations of the present invention. The implementing examples are only used to illustrate the present invention and do not limit the scope of the present invention.

Implementing Example 1

The plurality of Nd—Fe—B permanent magnets 20, 22 are sintered. Next, the plurality of Nd—Fe—B permanent magnets 20, 22 are phosphatized. After phosphatizing the plurality of Nd—Fe—B permanent magnets 20, 22, the plurality of Nd—Fe—B permanent magnets 20, 22 are washed using a solution selected from at least one of alcohol and naphtha and acetone and isopropanol to remove the grease and the rust from the surface of the Nd—Fe—B permanent magnets 20, 22. The surface of the Nd—Fe—B permanent magnets 20, 22 is then subjected to a plasma cleaning process to activate the surface of the Nd—Fe—B permanent magnets 20, 22. After the plasma cleaning process, the layer of insulating adhesive of epoxy resin and having a thickness of 1 μm is deposited on the surface of the Nd—Fe—B permanent magnets 20, 22 by spraying. After depositing the layer of insulating adhesive, the Nd—Fe—B permanent magnets 20, 22 are cured in a furnace at the initial temperature of 20° C. and at the initial duration of 24 hr.

The layer of insulating adhesive on the surface of second Nd—Fe—B permanent magnet 22 and the layer of insulating adhesive on the surface of the first Nd—Fe—B permanent magnet 20 between the first Nd—Fe—B permanent magnet 20 and the second Nd—Fe—B permanent magnet 22 by stacking the second Nd—Fe—B permanent magnet 22 on the first Nd—Fe—B permanent magnet 20 to form the combined adhesive layer 52 of insulating adhesive between the first Nd—Fe—B permanent magnet 20 and the second Nd—Fe—B permanent magnet 22 having a total thickness of 2 μm.

Next, the clamping tool apparatus 24 as described above is used. The first Nd—Fe—B permanent magnet 20 and the second Nd—Fe—B permanent magnet 22 are sandwiched between the upper plate 42 of the clamping tool apparatus 24 and the lower plate 26 of the clamping tool apparatus 24 and the predetermined clamping pressure of 0.1 MPa is applied to the Nd—Fe—B permanent magnets 20, 22 to produce the stacked Nd—Fe—B permanent magnet 20, 22.

After producing the stacked Nd—Fe—B permanent magnet 20, 22, the clamping tool apparatus 24 and the Nd—Fe—B permanent magnets 20, 22 are placed in the furnace for curing under the predetermined temperature of 150° C. for the predetermined duration of 12 hr. Then, the stacked Nd—Fe—B permanent magnet 20, 22 is cooled to room temperature. After cooling the stacked Nd—Fe—B permanent magnet 20, 22, the stacked Nd—Fe—B permanent magnet 20, 22 is machined using a wire cutting tool. Then, a protective layer of epoxy resin and having a thickness of 8 μm is deposited on the stacked Nd—Fe—B permanent magnet 20, 22.

Implementing Example 2

The rare earth metal powder containing Terbium is diffused into the plurality of Nd—Fe—B permanent magnets 20, 22. Next, the plurality of Nd—Fe—B permanent magnets 20, 22 are phosphatized. After phosphatizing the plurality of Nd—Fe—B permanent magnets 20, 22, the plurality of Nd—Fe—B permanent magnets 20, 22 are washed using a solution selected from at least one of alcohol and naphtha and acetone and isopropanol to remove the grease and the rust from the surface of the Nd—Fe—B permanent magnets 20, 22. The surface of the Nd—Fe—B permanent magnets 20, 22 is then subjected to a plasma cleaning process to activate the surface of the Nd—Fe—B permanent magnets 20, 22. After the plasma cleaning process, the layer of insulating adhesive of phenol resin and having a thickness of 50 μm is deposited on the surface of the Nd—Fe—B permanent magnets 20, 22 using a brush. After depositing the layer of insulating adhesive, the Nd—Fe—B permanent magnets 20, 22 are cured in a furnace at the initial temperature of 135° C. and at the initial duration of 12 hr.

The layer of insulating adhesive on the surface of second Nd—Fe—B permanent magnet 22 and the layer of insulating adhesive on the surface of the first Nd—Fe—B permanent magnet 20 between the first Nd—Fe—B permanent magnet 20 and the second Nd—Fe—B permanent magnet 22 by stacking the second Nd—Fe—B permanent magnet 22 on the first Nd—Fe—B permanent magnet 20 to form the combined adhesive layer 52 of insulating adhesive between the first Nd—Fe—B permanent magnet 20 and the second Nd—Fe—B permanent magnet 22 having the total thickness of 100 μm. For this example, a plurality of twelve Nd—Fe—B permanent magnets 20, 22 are stacked together with the combined adhesive layer 52 of insulating adhesive having the total thickness of 100 μm being disposed between two consecutive Nd—Fe—B permanent magnets 20, 22.

Next, the clamping tool apparatus 24 as described above is used. The Nd—Fe—B permanent magnets 20, 22 are sandwiched between the upper plate 42 of the clamping tool apparatus 24 and the lower plate 26 of the clamping tool apparatus 24 and the predetermined clamping pressure of 5MPa is applied to produce the stacked Nd—Fe—B permanent magnet 20, 22.

After producing the stacked Nd—Fe—B permanent magnet 20, 22, the clamping tool apparatus 24 and the Nd—Fe—B permanent magnets 20, 22 are then placed in the furnace for curing under the predetermined temperature of 250° C. for the predetermined duration of 6 hr. Then, the stacked Nd—Fe—B permanent magnet 20, 22 is cooled to room temperature. After cooling the stacked Nd—Fe—B permanent magnet 20, 22, the stacked Nd—Fe—B permanent magnet 20, 22 is machined using a multi-wire cutting tool. Then, the protective layer of phenol resin and having the thickness of 29 μm is deposited on the stacked Nd—Fe—B permanent magnet 20, 22.

Implementing Example 3

The rare earth metal powder containing Dysprosium is diffused into the plurality of Nd—Fe—B permanent magnets 20, 22. Next, the plurality of Nd—Fe—B permanent magnets 20, 22 are phosphatized. After phosphatizing the plurality of Nd—Fe—B permanent magnets 20, 22, the plurality of Nd—Fe—B permanent magnets 20, 22 are washed using a solution selected from at least one of alcohol and naphtha and acetone and isopropanol to remove the grease and the rust from the surface of the Nd—Fe—B permanent magnets 20, 22. The surface of the Nd—Fe—B permanent magnets 20, 22 is then subjected to a plasma cleaning process to activate the surface of the Nd—Fe—B permanent magnets 20, 22. After the plasma cleaning process, the layer of insulating adhesive of epoxy resin and having a thickness of 100 μm is deposited on the surface of the Nd—Fe—B permanent magnets 20, 22 using a roller. After depositing the layer of insulating adhesive, the Nd—Fe—B permanent magnets 20, 22 are cured in a furnace at the initial temperature of 250° C. and at the initial duration of 0.1 hr.

The layer of insulating adhesive on the surface of second Nd—Fe—B permanent magnet 22 and the layer of insulating adhesive on the surface of the first Nd—Fe—B permanent magnet 20 between the first Nd—Fe—B permanent magnet 20 and the second Nd—Fe—B permanent magnet 22 by stacking the second Nd—Fe—B permanent magnet 22 on the first Nd—Fe—B permanent magnet 20 to form the combined adhesive layer 52 of insulating adhesive between the first Nd—Fe—B permanent magnet 20 and the second Nd—Fe—B permanent magnet 22 having the total thickness of 200 µm. For this example, a plurality of twenty-five Nd—Fe—B permanent magnets 20, 22 are stacked together with the combined adhesive layer 52 of insulating adhesive having the total thickness of 200 µm being disposed between each of the Nd—Fe—B permanent magnets 20, 22.

Next, the clamping tool apparatus 24 as described above is used. The Nd—Fe—B permanent magnets 20, 22 are sandwiched between the upper plate 42 of the clamping tool apparatus 24 and the lower plate 26 of the clamping tool apparatus 24 and the predetermined clamping pressure of 10 MPa is applied to produce the stacked Nd—Fe—B permanent magnet 20, 22.

After producing the stacked Nd—Fe—B permanent magnet 20, 22, the clamping tool apparatus 24 and the Nd—Fe—B permanent magnets 20, 22 are then placed in the furnace for curing under the predetermined temperature of 350° C. for the predetermined duration of 0.1 hr. Then, the stacked Nd—Fe—B permanent magnet 20, 22 is cooled to room temperature. After cooling the stacked Nd—Fe—B permanent magnet 20, 22, the stacked Nd—Fe—B permanent magnet 20, 22 is machined using a multi-wire cutting tool. Then, the protective layer of phenol resin and having the thickness of 50 µm is deposited on the stacked Nd—Fe—B permanent magnet 20, 22.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A method for bonding a plurality of Nd—Fe—B permanent magnets having a first Nd—Fe—B permanent magnet and a second Nd—Fe—B permanent magnet including rust and grease disposed on a surface of the Nd—Fe—B permanent magnets using an insulating adhesive and a clamping tool apparatus including a lower plate having a pair of magnet positioning members extending outwardly from the lower plate and an upper plate slidably disposed on the magnet positioning members and a fastener disposed on each of the magnet positioning members, said method comprising the sequential steps of:

cleaning the plurality of the Nd—Fe—B permanent magnets including the grease and the rust to remove the grease and the rust, said step of cleaning the plurality of Nd—Fe—B permanent magnets further including a step of phosphating the plurality of Nd—Fe—B permanent magnets, said step of cleaning the plurality of Nd—Fe—B permanent magnets further including a step of washing the plurality of Nd—Fe—B permanent magnets using a solution selected from at least one of alcohol and naphtha and acetone and isopropanol to remove the grease and the rust from the surface of the Nd—Fe—B permanent magnets following said step of phosphating, said step of cleaning the plurality of Nd—Fe—B permanent magnets further including a step of activating the surface of the Nd—Fe—B permanent magnets by subjecting the surface of the Nd—Fe—B permanent magnets to a plasma cleaning process following said step of washing, depositing a layer of insulating adhesive having a thickness of between 1 µm and 100 µm on the surface of each of the Nd—Fe—B permanent magnets, stacking the second Nd—Fe—B permanent magnet on the first Nd—Fe—B permanent magnet to combine the layer of insulating adhesive on the first Nd—Fe—B permanent magnet and the layer of insulating adhesive on the second Nd—Fe—B permanent magnet to form a combined adhesive layer between the first Nd—Fe—B permanent magnet and the second Nd—Fe—B permanent magnet, applying a predetermined clamping pressure to the first Nd—Fe—B permanent magnet and the second Nd—Fe—B permanent magnet to produce a stacked Nd—Fe—B permanent magnet, said step of applying the predetermined clamping pressure further including a step of sandwiching the first Nd—Fe—B permanent magnet and the second Nd—Fe—B permanent magnet between the upper plate of the clamping tool apparatus and the lower plate of the clamping tool apparatus, said step of applying the predetermined clamping pressure being further defined as applying the predetermined clamping pressure of between 0.1 MPa and 10 MPa using the upper plate of the clamping tool and the lower plate of the clamping tool to the first Nd—Fe—B permanent magnet and the second Nd—Fe—B permanent magnet, curing the stacked Nd—Fe—B permanent magnet, said step of curing the stacked Nd—Fe—B permanent magnet being further defined as curing the stacked Nd—Fe—B permanent magnet at a predetermined temperature of between 150° C. and 350° C. for a predetermined duration of between 0.1 hr and 12 hr, cooling the stacked Nd—Fe—B permanent magnet to room temperature, machining the stacked Nd—Fe—B permanent magnet, depositing a protective layer on the stacked Nd—Fe—B permanent magnet, curing the layer of insulating adhesive on the surface of the Nd—Fe—B permanent magnets prior to said step of sandwiching the layer of insulating adhesive on the surface of second Nd—Fe—B permanent magnet and the layer of insulating adhesive on the surface of the first Nd—Fe—B permanent magnet, and said step of curing the layer of insulating adhesive on the surface of the Nd—Fe—B permanent magnets being further defined as heating the Nd—Fe—B permanent magnets including the layer of insulating adhesive at an initial temperature of between 20° C. and 250° C. for an initial duration of between 0.1 hr and 24 hr prior to said step of sandwiching the layer of insulating adhesive on the surface of second Nd—Fe—B permanent magnet and the layer of insulating adhesive on the surface of the first Nd—Fe—B permanent magnet.

2. The method as set forth in claim 1 wherein said step of machining the stacked Nd—Fe—B permanent magnet is further defined as using a cutting apparatus selected from a wire cutting tool and a disc cutting tool and a multi-wire cutting tool to machine the stacked Nd—Fe—B permanent magnet; and said step of depositing the protective layer is further defined as depositing the protective layer selected from an epoxy resin and phenol resin to a thickness of between 8 μm and 50 μm on the stacked Nd—Fe—B permanent magnet.

3. The method of bonding the plurality of Nd—Fe—B permanent magnets as set forth in claim 1 wherein said step of stacking is further defined combining the layer of insulating adhesive on the first Nd—Fe—B permanent magnet and the layer of insulating adhesive on the second Nd—Fe—B permanent magnet to form the combined adhesive layer of insulating adhesive between first Nd—Fe—B permanent magnet and the second Nd—Fe—B permanent magnet defining a total thickness between 2 μm and 200 μm.

4. The method as set forth in claim 1 wherein said step of depositing the layer of insulating adhesive is further defined as depositing a thermosetting resin selected from one of epoxy resin and phenol resin on the surface of the first Nd—Fe—B permanent magnet and the surface of the second Nd—Fe—B permanent magnet.

5. The method as set forth in claim 1 wherein said step of depositing the layer of insulating adhesive is further defined as spraying, brush painting, or roller painting the layer of insulating adhesive on the surface of the first Nd—Fe—B permanent magnet and the surface of the second Nd—Fe—B permanent magnet.

6. The method as set forth in claim 1 further includes a step of sintering the plurality of Nd—Fe—B permanent magnets to densify the plurality of Nd—Fe—B permanent magnets prior to said step of cleaning.

7. The method in claim 1 further includes a step of diffusing a rare earth powder containing at least one of Terbium and Dysprosium into the plurality of Nd—Fe—B permanent magnets prior to said step of cleaning.

8. The method set forth in claim 1 further includes a step of repeating said steps of cleaning and depositing and applying and curing the layer of insulating adhesive on the on the surface of the Nd—Fe—B permanent magnets and stacking and curing the stacked Nd—Fe—B permanent magnet and cooling and machining and depositing to stack between two and up to twenty-five pieces of the Nd—Fe—B permanent magnets together.

* * * * *